(12) United States Patent
Achten et al.

(10) Patent No.: US 11,384,168 B2
(45) Date of Patent: Jul. 12, 2022

(54) TWO-PHASE 3D PRINTING METHOD

(71) Applicant: Covestro Deutschland AG, Leverkusen (DE)

(72) Inventors: Dirk Achten, Leverkusen (DE); Thomas Buesgen, Leverkusen (DE); Roland Wagner, Leverkusen (DE); Florian Stempfle, Cologne (DE); Christoph Tomczyk, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 153 days.

(21) Appl. No.: 16/765,947

(22) PCT Filed: Dec. 12, 2018

(86) PCT No.: PCT/EP2018/084573
§ 371 (c)(1),
(2) Date: May 21, 2020

(87) PCT Pub. No.: WO2019/121245
PCT Pub. Date: Jun. 27, 2019

(65) Prior Publication Data
US 2020/0353677 A1    Nov. 12, 2020

(30) Foreign Application Priority Data
Dec. 21, 2017    (EP) .................................... 17209426

(51) Int. Cl.
*C08F 2/48* (2006.01)
*B29C 64/314* (2017.01)
(Continued)

(52) U.S. Cl.
CPC .............. *C08F 2/48* (2013.01); *B29C 64/129* (2017.08); *B29C 64/188* (2017.08);
(Continued)

(58) Field of Classification Search
CPC ... B29C 64/129; B29C 64/188; B29C 64/232; B29C 64/245; B29C 64/255;
(Continued)

(56) References Cited

U.S. PATENT DOCUMENTS 5,573,721 A   11/1996  Gillette
6,191,181 B1   2/2001  Weikard et al.
(Continued)

FOREIGN PATENT DOCUMENTS

WO    WO 9320993 A1    10/1993

OTHER PUBLICATIONS

International Search Report, PCT/EP2018/084573, dated Feb. 11, 2019, Authorized officer: Edgar Kaumann.

*Primary Examiner* — Michael M. Robinson
(74) *Attorney, Agent, or Firm* — Jed C. Benson

(57) ABSTRACT

An additive manufacturing method wherein the carrier (400) is within a vessel (100), the vessel contains the free-radically crosslinkable resin (300) and a liquid (200) which is immiscible with the free-radically cross-linkable resin (300) and has a higher density than the free-radically crosslinkable resin (300), such that the free-radically crosslinkable resin (300) floats on top of the liquid (200) and, prior to each step II), the distance between the carrier (400) and the free-radically crosslinkable resin (300) is altered such that a layer of the free-radically crosslinkable resin forms above the uppermost surface (420), viewed in vertical direction, of the previously deposited layer of the construction material (600) and at least partially forms contact with this uppermost surface (420) of the previously deposited layer of the construction material (600). The free-radically crosslinkable resin (300) comprises a urethane (meth)acrylate. The invention further relates to the use of a free-radically crosslinkable (Continued)

resin comprising a urethane (meth)acrylate as construction material in a two-phase 3D printing method.

14 Claims, 1 Drawing Sheet

(51) Int. Cl.
B29C 64/188 (2017.01)
B29C 64/232 (2017.01)
B29C 64/245 (2017.01)
B29C 64/255 (2017.01)
B29C 64/129 (2017.01)
B29C 64/268 (2017.01)
C08F 220/34 (2006.01)
B33Y 10/00 (2015.01)
B33Y 70/00 (2020.01)
B33Y 40/20 (2020.01)

(52) U.S. Cl.
CPC .......... B29C 64/232 (2017.08); B29C 64/245 (2017.08); B29C 64/255 (2017.08); B29C 64/268 (2017.08); B29C 64/314 (2017.08); C08F 220/343 (2020.02); B29K 2833/08 (2013.01); B29K 2833/26 (2013.01); B29K 2891/00 (2013.01); B29K 2995/0063 (2013.01); B33Y 10/00 (2014.12); B33Y 40/20 (2020.01); B33Y 70/00 (2014.12)

(58) Field of Classification Search
CPC . B29C 64/268; B29C 64/314; C08F 220/343; B29K 2833/08; B29K 2833/26; B29K 2891/00; B29K 2995/0063
See application file for complete search history.

(56) References Cited

U.S. PATENT DOCUMENTS

| 6,838,035 | B1 | 1/2005 | Ederer et al. |
| 2015/0072293 | A1* | 3/2015 | DeSimone ............ G03F 7/0037 355/18 |
| 2016/0200044 | A1* | 7/2016 | Voit ........................ B29C 64/20 264/401 |

* cited by examiner

TWO-PHASE 3D PRINTING METHOD

CROSS-REFERENCE TO RELATED APPLICATION

This application is a national stage application under 35 U.S.C. § 371 of PCT/EP2018/084573, filed Dec. 12, 2018, which claims the benefit of European Application No. 17209426, filed Dec. 21, 2017, each of which is incorporated herein by reference.

FIELD

The present invention relates to a process for producing an article comprising the steps of:
I) depositing a free-radically crosslinked resin on a carrier (400) to obtain a ply of a construction material (600) joined to the carrier (400) which corresponds to a first selected cross section of the article;
II) depositing a free-radically crosslinked resin on a previously deposited ply of the construction material (600) to obtain a further ply of the construction material (610) which corresponds to a further selected cross section of the article and is joined to the previously applied ply (600);
III) repeating step II) until the article has been formed.

The invention further relates to the use of a free-radically crosslinkable resin comprising a urethane (meth)acrylate as a construction material in a two-phase stereolithography process.

BACKGROUND

Additive manufacturing processes are processes by means of which articles are constructed in layerwise fashion. They therefore differ markedly from other processes for producing articles such as material removal. In the latter method, an article is processed such that it takes on its final geometry via removal of material.

Free-radically curable resins may be employed in additive manufacturing processes. Examples of such processes are stereolithography processes. US 2015/1072293 A1 discloses an additive manufacturing process using a photopolymer in which photo-curable polyurethane compositions are considered particularly suitable materials. Such compositions contain a polyurethane based on an aliphatic diisocyanate, poly(hexamethylene isophthalate glycol) and optionally 1,4-butanediol and also a polyfunctional acrylic ester, a photoinitiator and an antioxidant. Photo-curable thermoplastic polyurethane elastomers may contain photo-reactive diacetylene diols as chain extenders.

US 2016/0200044 A1 relates to a 3-D printing system comprising a light source and at least one cartridge housing, wherein the housing has a fill opening, and further comprising a resin which floats on a liquid platform.

U.S. Pat. No. 5,573,721 discloses a system for producing a three-dimensional object comprising a reactive liquid medium and a nonreactive liquid medium immiscible therewith.

WO 93/20993 A1 describes a stereolithography process in a closed container under elevated pressure and temperature.

SUMMARY

It is an object of the invention to at least partially overcome at least one disadvantage of the prior art. It is a further object of the invention to provide an additive manufacturing process in which the specific advantages of the urethane (meth)acrylates take effect and which simultaneously requires as little exposed building material as possible.

The object is achieved in accordance with the invention by a process as claimed in the independent claim. Advantageous developments are specified in the subsidiary claims. They may be combined as desired unless the opposite is clear from the context.

A process for producing an article comprises the steps of:
I) depositing a free-radically crosslinked resin on a carrier to obtain a ply of a construction material joined to the carrier which corresponds to a first selected cross section of the article;
II) depositing a free-radically crosslinked resin on a previously deposited ply of the construction material to obtain a further ply of the construction material which corresponds to a further selected cross section of the article and is joined to the previously applied ply;
III) repeating step II) until the article has been formed;
wherein the depositing of a free-radically crosslinked resin at least in step II) is carried out by illumination and/or irradiation of a selected region of a free-radically crosslinkable resin according to the particular selected cross section of the article, wherein the carrier is arranged inside a container and the container contains the free-radically crosslinkable resin and a liquid immiscible with the free-radically crosslinkable resin which has a higher density than the free-radically crosslinkable resin, thus causing the free-radically crosslinkable resin to float on the liquid and wherein before each step II) the distance between the carrier and the free-radically crosslinkable resin is altered such that a layer of the free-radically crosslinkable resin forms above the vertically uppermost surface of the previously deposited ply of the construction material and at least partially contacts this uppermost surface of the previously deposited ply of the construction material.

The free-radically crosslinkable resin comprises a urethane (meth)acrylate.

BRIEF DESCRIPTION OF THE DRAWINGS

Various features and characteristics of the inventions described in this specification may be better understood by reference to the accompanying figures, in which.

DETAILED DESCRIPTION

Figure 1:
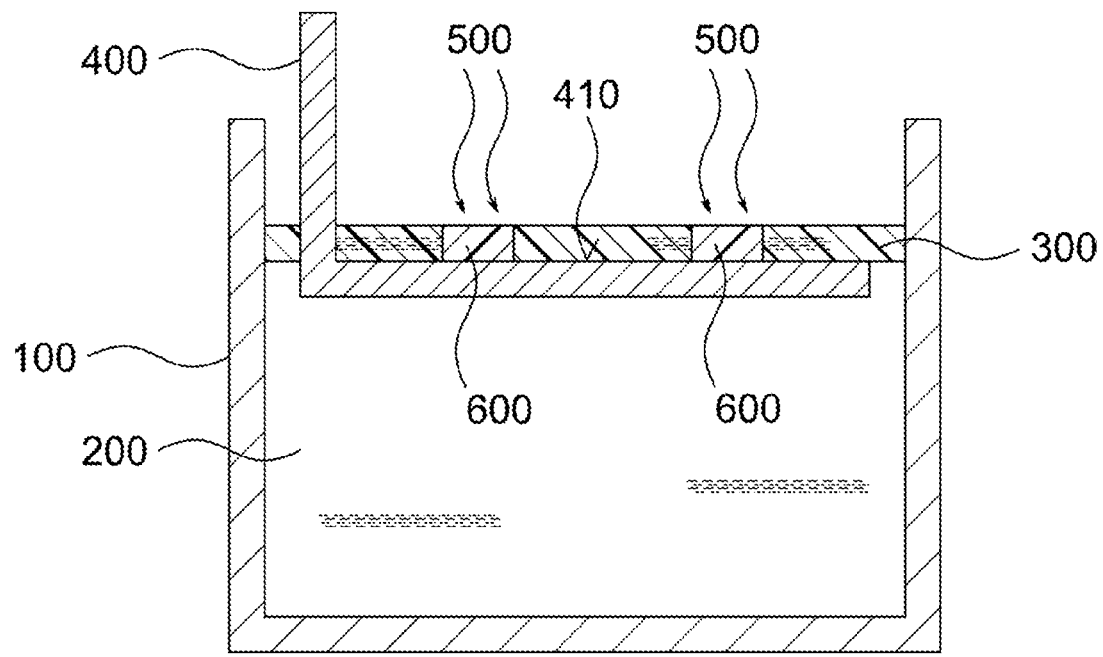
FIG. 1 shows a step during the process according to the invention.

The process according to the invention may be regarded as a 3-D printing process in which two liquid phases are present and the free-radically crosslinkable resin as one phase floats atop another phase. Thus a large part of the volume of the liquids present in the container may be made up of inert and cost-effective liquids as the lower phase.

Urethane (meth)acrylates feature exceptional properties after free-radical crosslinking. However, as a result of the high concentration of urethane groups these compounds have particularly high viscosities and can therefore be employed in customary 3-D printing processes only in combination with large amounts of reactive diluents which due to the high resulting double bond density of the formulations causes a high shrinkage of the cured products to cause significant deviations of the components from the planned component geometries. The use of urethane (meth)acrylates in the process according to the invention makes it possible to obtain products of high mechanical quality with a low reactive diluent proportion and low shrinkage.

The free-radically crosslinkable resin preferably contains photo-activatable initiators such as for example benzoin ether, benzoin methyl ether, benzoin isopropyl ether, substituted benzoin ethers such as anisoin methyl ether, acetophenones, such as 2,2-diethoxyacetophenone, substituted acetophenones such as 2,2-diethoxyacetophenone, 2,2-dimethoxy-2-phenylacetophenone and 1-phenyl-2-hydroxy-2-methyl-1-propanone, substituted alpha-ketols, such as 2-methyl-2-hydroxypropiophenone, aromatic sulphonyl chlorides and photoactive oximes such as 1-phenyl-1,1-propanedione-2-(O-ethoxycarbonyl)oxime.

According to the invention it is provided that the liquid and the free-radically crosslinkable resin are immiscible. "Immiscible" is to be understood as meaning in particular that the solubility of the free-radically crosslinkable resin in the liquid at 20° C. is ≤10 g/L, preferably ≤1 g/L, more preferably ≤0.1 g/L and particularly preferably ≤0.01 g/L. Particularly suitable liquids furthermore do not result in any unwanted discoloration of the article and result only in reversible swelling or preferably no swelling whatsoever.

In a preferred embodiment the free-radically crosslinkable resin comprises at least one isocyanate-functional compound which comprises at least one radiation-curable group selected from vinyl, propenyl, allyl, vinyl ether, maleyl, fumaryl, maleimide, dicyclopentadienyl, acrylamide and (meth)acrylate groups or a combination of at least two of these (component A) and comprises at least one NCO-reactive compound (component B).

In addition to this, it is preferable when the free-radically crosslinkable resin comprises an unsaturated urethane acrylate bearing no isocyanate groups (component C) and at least one (meth)acrylate component (component D).

The isocyanate-functional compounds employable according to the invention are for example constructed from polyisocyanates, wherein some of the originally present NCO groups have been reacted with hydroxy-functional compounds comprising functional groups selected from the group consisting of vinyl, propenyl, allyl, vinyl ether, maleyl, fumaryl, maleimide, dicyclopentadienyl, acrylamide and (meth)acrylate groups or a combination of at least two of these so that the isocyanate-functional compound bears vinyl, propenyl, allyl, vinyl ether, maleyl, fumaryl, maleimide, dicyclopentadienyl, acrylamide and/or (meth)acrylate groups as well as isocyanate groups.

Typically employed as polyisocyanates are aromatic, aliphatic and cycloaliphatic polyisocyanates having a number-average molecular weight of below 800 g/mol.

Suitable are for example diisocyanates from the group of 2,4-/2,6-toluene diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI) and mixtures consisting of these compounds. Preferred starting materials for producing the isocyanate-functional compounds are hexamethylene diisocyanate (HDI), isophorone diisocyanate (IPDI) and/or 4,4'-diisocyanatodicyclohexylmethane.

Likewise suitable as polyisocyanates are reaction products of the abovementioned isocyanates with themselves or with one another to afford uretdiones or isocyanurates. Examples include Desmodur® N3300, Desmodur® N3400 or Desmodur® N3600 (all from Covestro AG, Leverkusen, Del.). Likewise suitable are derivatives of isocyanates, such as allophanates or biurets. Examples include Desmodur® N100, Desmodur® N75MPA/BA or Desmodur® VPLS2102 (all from Covestro AG, Leverkusen, Del.).

In a further preferred embodiment the component A) contains uretdiones which can react with the component B) by conversion into urethanes, allophanates, ureas, biurets, thiourethanes, thioallophanates during and/or after production of the article.

In a further preferred embodiment the component A) contains blocked isocyanates (preferably eliminant-free blocked) isocyanates which can react with the component B) by conversion into urethanes, allophanates, ureas, biurets, thiourethanes, thioallophanates during and/or after production of the article.

Suitable hydroxyl-containing compounds comprising radiation-curable groups are 2-hydroxyethyl (meth)acrylate, polyethylene oxide mono(meth)acrylate (for example PEA6/PEM6; Laporte Performance Chemicals Ltd., UK), polypropylene oxide mono(meth)acrylate (for example PPA6, PPM5S; Laporte Performance Chemicals Ltd., UK), polyalkylene oxide mono(meth)acrylate (for example PEM63P, Laporte Performance Chemicals Ltd., UK), poly (8-caprolactone) mono(meth)acrylates such as for example Tone Ml 00@ (Dow, Schwalbach, Del.), 2-hydroxypropyl (meth)acrylate, 4-hydroxybutyl (meth)acrylate, hydroxybutylvinyl ether, 3-hydroxy-2,2-dimethylpropyl (meth)acrylate, the hydroxyl-functional mono-, di- or, if possible, higher acrylates such as for example glycerol di(meth)acrylate, trimethylolpropane di(meth)acrylat, pentaerythritol tri(meth)acrylate or dipentaerythritol penta(meth)acrylate which are obtainable by reaction of polyhdric, optionally alkoxylated alcohols such as trimethylolpropane, glycerol, pentaerythritol, di-pentaerythritol.

Also employable in the urethanization reaction as such OH-functional compounds comprising radiation-curable groups are the reaction products of unsaturated acids with optionally unsaturated epoxy compounds, such as the reaction products of (meth)acrylic acid with glycidyl (meth)acrylate or bisphenol A diglycidyl ether.

The isocyanate-functional compound which comprises at least one radiation-curable group selected from the group consisting of vinyl ether, maleyl, fumaryl, maleimide, dicyclopentadienyl, acrylamide, (meth)acrylate groups or a combination of at least two of these is an isocyanate-functional urethane acrylate. Urethane acrylate is to be understood as meaning compounds comprising at least one isocyanate group and at least one acrylic group per molecule. Such systems are known per se and have the property of undergoing free-radical polymerization both via an NCO/OH reaction with polyols or polyamines and via the acrylate function by means of UV light or electron radiation. Since two different polymerization mechanisms come into play in these compounds, compositions containing such compounds are also known as "dual-cure" systems.

The isocyanate-functional urethane acrylates employable according to the invention are constructed for example from polyisocyanates, wherein some of the originally present NCO groups have been reacted with hydroxyl-functional acrylates or methacrylates so that the molecule bears terminal methacrylate groups and isocyanate groups.

Contemplated starting compounds for isocyanate-functional urethane acrylates include monomeric di- or triisocyanates. Examples of suitable monomeric polyisocyanates are 1,5-naphthylene diisocyanate, 2,2'-, 2,4- and/or 4,4'-diphenylmethane diisocyanate (MDI), hydrogenated MDI (H12MDI), xylylene diisocyanate (XDI), tetramethylxylylene diisocyanate (TMXDI), 4,4'-diphenyldimethylmethane diisocyanate, 4,4'-dibenzyl diisocyanate, 1,3-phenylene diisocyanate, 1,4-phenylene diisocyanate, tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, hexane 1,6-diisocyanate (HDI), dicyclohexylmethane diisocyanate, cyclohexane 1,4-diisocyanate, ethylene diisocyanate, trimethylhexamethylene diisocyanate, 1,4-disocyanatobutane, 1,12-diisocyanatododecane, dimer fatty acid diisocyanate, or uretdiones, biurets or isocyanurates of diisocyanates. Isocyanate trimers, such as are described for example in EP 1 002 818 B1, may also be employed.

Employed hydroxyl-functional acrylates or methacrylates in principle include all conceivable compounds of this type. The compounds contain at least one monovalent hydroxyl-functional ester of (meth)acrylic acid. This is to be understood as meaning not only esters of acrylic acid or methacrylic acid with dihhydric alcohols comprising a free hydroxyl group such as for example 2-hydroxyethyl, 2- or 3-hydroxypropyl or 2-, 3- or 4-hydroxybutyl (meth)acrylate but also any desired mixtures of such compounds. Also contemplated are monohydric (meth)acryloyl-containing alcohols or reaction products consisting substantially of such alcohols obtained by esterification of n-hydric alcohols with (meth)acrylic acid, wherein employable alcohols also include mixtures of different alcohols so that n represents an integer or a statistical average of greater than 2 to 4, preferably 3, and wherein per mol of recited alcohols from (n-0.8) to (n-1.2), preferably (n-1 mol, of (meth)acrylic acid are employed. These compounds/product mixtures include for example the reaction products of glycerol, trimethylolpropane and/or pentaerythritol, of low molecular weight alkoxylation products of such alcohols, for example ethoxylated or propoxylated trimethylolpropane, for example the addition product of ethylene oxide onto trimethylolpropane having an OH number of 550 or of any desired mixtures of such at least trihydric alcohols with dihydric alcohols such as for example ethylene glycol or propylene glycol, with (ii) (meth)acrylic acid in the recited molar ratio.

Production of urethane (meth)acrylates employable according to the invention may likewise proceed from a polymeric compound selected from the group consisting of polyester (meth)acrylates, polyether (meth)acrylates, polyetherester (meth)acrylates, unsaturated polyesters having allyl ether structural units and polyepoxy (meth)acrylates. This polymeric compound forms the polymer backbone and is converted with polyisocyanates to produce the urethane acrylate. If desired the isocyanate groups of the obtained urethane acrylates may then in turn be reacted with monomeric compounds each having a hydroxyl function and at least one (meth)acrylate group, thus producing terminal acrylate groups. If only some of the isocyanate groups are converted isocyanate-functional urethane acrylates are obtained. If the isocyanate groups are completely converted an unsaturated urethane acrylate is produced.

In a particular embodiment the isocyanate-functional urethane acrylate has an NCO-functionality of 0.8 to 6, preferably 1 to 4, more preferably 1.2 to 3, very particularly preferably 1.5 to 2.5, and in particular 2.

As concerns the double bond functionality of the isocyanate-functional urethane acrylate this may vary over wide ranges. It is preferable when the double bond functionality is 0.5 to 6, preferably 1 to 4, more preferably 1.5 to 3. Double bond functionality is defined as the statistical average number of double bonds per molecule of the isocyanate-functional urethane acrylate.

The isocyanate-functional urethane acrylate further preferably has an average molecular weight of 150 to 5000 g/mol, in particular of 300 to 2500 g/mol.

This resin composition further contains at least one NCO-reactive compound (component B). Any polyol known in the prior art for producing polyurethane polymers for example may be used for this purpose. Suitable polyols include in particular polyether polyols, polyester polyols, polyether polyester polyols, polycarbonate polyols, polyester carbonate polyols or polyether carbonate polyols. Further examples include aliphatic alcohols and polyols having 1-6 OH groups per molecule and 2 to about 30 carbon atoms. Suitable aliphatic polyols are for example ethylene glycol, 1,2- or 1,3-propanediol, 1,4-butanediol, 1,3-butanediol, 2,3-butanediol, 1,4-butenediol, 1,5-pentanediol, pentenediols, 1,6-hexanediol, 1,8-octanediol, dodecanediol and higher homologues, isomers and mixtures of such compounds. Likewise suitable are higher-functional alcohols such as for example glycerol, trimethylolpropane, pentaerythritol or sugar alcohols, such as sorbitol or glucose, and oligomeric ethers or reaction products with ethylene or propylene oxide. Also employable are the reaction products of low molecular weight, polyfunctional alcohols with alkylene oxides, so-called polyether polyols. The alkylene oxides preferably have two to about four carbon atoms. Suitable compounds include for example the reaction products of ethylene glycol, propylene glycol, glycerol, trimethylolethane or trimethylolpropane, pentaerythritol with ethylene oxide, propylene oxide or butylene oxide or mixtures thereof. The recited alcohols may themselves also be "dual-functional", i.e. may also comprise unsaturated double bonds and hydroxyl groups, wherein the double bond is obtainable for example by partial esterification with acrylic acid or reaction with di- or polyisocyanates and further reaction—as described hereinabove—with hydroxyl-functional double bond carriers. The molecular weight of the polyols may vary over wide ranges. The molecular weight (Mn) of the polyols is for instance 50 to 5000 g/mol (number-average molecular weight, Mn, as determinable by GPC), in particular from 150 to 2500 g/mol. Such polyols are known to those skilled in the art and commercially available.

The polyol in particular features an OH functionality of 1 to 6, preferably 1.5 to 5, more preferably 1.7 to 4, particularly preferably 1.8 to 3.5 and very particularly preferably 2.

The NCO-reactive compound (component B) may also be a thiol, amine, epoxide or mixtures thereof.

The unsaturated urethane acrylate (component C) differs from the isocyanate-functional urethane acrylate in that it bears no free NCO groups. Similarly to the isocyanate-functional urethane acrylates the unsaturated urethane acrylates employed according to the invention are constructed from a polyfunctional isocyanate, wherein in the case of the unsaturated urethane acrylates all of the isocyanate groups have been reacted with a hydroxyl-functional acrylate or methacrylate. The alternative described hereinabove in connection with the isocyanate-functional urethane acrylates having a polymeric backbone composed of polyester (meth)acrylates, polyether (meth)acrylates, polyetherester (meth)acrylates, unsaturated polyesters having allyl ether structural units and polyepoxy(meth)acrylaten may also be used.

As concerns the polyfunctional isocyanates employable for the unsaturated urethane acrylates the compounds suitable therefor are in principle the same compounds recited hereinabove in connection with the isocyanate-functional urethane acrylates. The polyfunctional isocyanates for the unsaturated urethane acrylates are preferably selected from the aliphatic polyfunctional isocyanates. In other words an unsaturated aliphatic urethane acrylate is preferred as component C). These compounds are particularly preferred because they improve the flexibility of the composition used according to the invention after curing.

In a further embodiment of the invention the unsaturated urethane acrylate has a proportion of OH groups. The OH functionality is generally low and may be for example 0.01 to 1, preferably 0.05 to 0.8, more preferably 0.08 to 0.6, very particularly preferably 0.09 to 0.5 and in particular 0.1. These OH groups are likewise available for a reaction with NCO groups.

The unsaturated urethane acrylate further preferably has an average molecular weight of 200 to 3000, in particular of 300 to 2000.

The double bond functionality of the unsaturated urethane acrylate may vary over wide ranges. It is preferable when the double bond functionality is 1 to 6, preferably 2 to 5, more preferably 2.5 to 4. The double bond functionality is defined as the statistical average number of double bonds per molecule of the unsaturated urethane acrylate.

The methacrylate component (component D) may be selected from aliphatic and/or aromatic methacrylates. Employable alkyl (meth)acrylates are for example linear or branched monofunctional unsaturated (meth)acrylates of non-tertiary alkyl alcohols whose alkyl groups comprise 4 to 14 and in particular 4 to 12 carbon atoms. Examples of such lower alkyl acrylates are n-butyl, n-pentyl, n-hexyl, cyclohexyl, isoheptyl, n-nonyl, n-decyl, isohexyl, isobornyl, 2-ethyloctyl, isooctyl, 2-ethylhexyl, tetrahydrofurfuryl, ethoxyethoxyethyl, phenoxyethyl, cyclotrimethlypropane, 3,3,5-trimethylcyclohexyl, t-butylcyclohexyl and t-butyl acrylates and methacrylates. Preferred alkyl acrylates are isooctyl acrylate, 2-ethylhexyl acrylate, 2-ethyloctyl acrylate, n-butyl acrylate, tetrahydrofurfuryl acrylate, isobornyl acrylate, ethoxyethoxyethyl acrylate, phenoxyethyl acrylate, 3,3,5-trimethylcyclohexyl acrylate and cyclohexyl acrylate.

Contemplated thermally activated initiators include organic peroxides, such as di-tert-butyl peroxide, benzoyl peroxide and lauryl peroxide, and 2,2'-azobis(isobutyronitrile). The usage amounts of the abovementioned initiators are known in principle to those skilled in the art and are for example about 0.01% to 8% by weight, in particular 0.5% to 5% by weight, preferably 1% to 3% by weight.

The composition may further include customary additives. Contemplated here are for example fillers, stabilizers, in particular UV stabilizers, fungicides, dyes, pigments, polymerization catalysts, plasticizers and solvents known to those skilled in the art. Employable polymerization catalysts include for example known-per-se isocyanate addition catalysts, for example triethylamine, 1,4-diazabicyclo-[2,2,2]-octane, tin dioctoate, dibutyltin dilaurate or bismuth octoate.

In a particularly preferred embodiment the free-radically crosslinkable resin contains the components in the following amounts, wherein the reported % by weight sum to 100% by weight:

component A) 10% to 79.9% by weight, in particular 15% to 75% by weight,
component B) 20% to 89.9% by weight, in particular 25% to 85% by weight,
component C) 0% to 50% by weight, in particular 15% to 30% by weight,
component D) 0% to 35% by weight, in particular 10% to 25% by weight.

The use of concepts from dual-cure chemistry, preferably in the presence of isocyanates, further makes it possible to further improve the mechanical properties of the components after a downstream thermal curing process while simultaneously reducing component shrinkage. In a further preferred embodiment the article formed is thus heated to ≥25° C. (preferably ≥50° C., more preferably ≥75° C.).

In a further preferred embodiment the liquid immiscible with the free-radically crosslinkable resin is selected from: silicone oils, halogenated hydrocarbons, polyethylene waxes, water, saltwater, glycerol, metal melts, ionic liquids and mixtures of the recited liquids. In the case of saltwater a saturated NaCl solution is preferred.

In a further preferred embodiment at least in step II) the depositing of the free-radically crosslinked resin is carried out using UV light. UV light having a wavelength of ≥250 nm and ≤420 nm is suitable, ≥300 nm and ≤400 nm being particularly suitable.

In a further preferred embodiment before every step II) the carrier is vertically lowered and the vertical position of the free-radically crosslinkable resin remains constant. In this embodiment the higher precision in the displacement of the carrier compared to an alteration of the liquid level in the container is utilized.

In a further preferred embodiment the liquid immiscible with the free-radically crosslinkable resin is heated to a temperature of ≥25° C. (preferably ≥50° C., more preferably ≥75° C.). This has the advantage that the viscosity of the resin can be reduced and that postreactions can proceed more rapidly in the already present free-radically crosslinked resin.

In a further preferred embodiment a vertical temperature gradient prevails in the liquid immiscible with the free-radically crosslinkable resin, wherein the temperature decreases vertically downward. Thus the resin may be brought to a lower viscosity while already crosslinked resin may be kept dimensionally stable at a lower temperature.

In a further preferred embodiment before every step II) the proportion withdrawn from the free-radically crosslinkable resin by deposition of the free-radically crosslinked resin is re-added. This ensures that a constant resin amount is always provided.

In a further preferred embodiment the amount of free-radically crosslinkable resin is provided at commencement of the process in such a way that it corresponds to the volume of the article to be produced plus an addition of ≤10% and that no new resin is added during the process. This addition is preferably ≤5% and more preferably ≤2%. This makes it possible to minimize the residual amount of resin remaining after termination of the process which would require disposal as waste.

In a further preferred embodiment the layer thickness of the free-radically crosslinked resin is varied from layer to layer through the vertical displacement of the carrier.

In a further preferred embodiment UV radiation employed for curing is projected onto the surface of the resin as an image by means of at least one projector, preferably with the surface of the last free-radically crosslinked resin layer as the focal plane.

In a further preferred embodiment UV radiation employed for curing is inscribed onto the surface of the resin by means of at least one laser, preferably with the last free-radically crosslinked resin layer as the focal plane.

In a further preferred embodiment the free-radically crosslinkable resin is a solid at 23° C. and during the process is heated to an extent such that it has a viscosity (DIN EN ISO 2884-1) of ≤100000 mPas (preferably ≤10000 mPas, more preferably ≤1000 mPas).

The invention further relates to the use of a free-radically crosslinkable resin comprising a urethane (meth)acrylate as a construction material in a two-phase 3-D printing process. Preferred urethane (meth)acrylates have been recited hereinabove in connection with the process according to the invention.

The invention is further elucidated with reference to the figures which follow without, however, being limited thereto.

FIG. 1 shows a step during the process according to the invention

Figure 2:
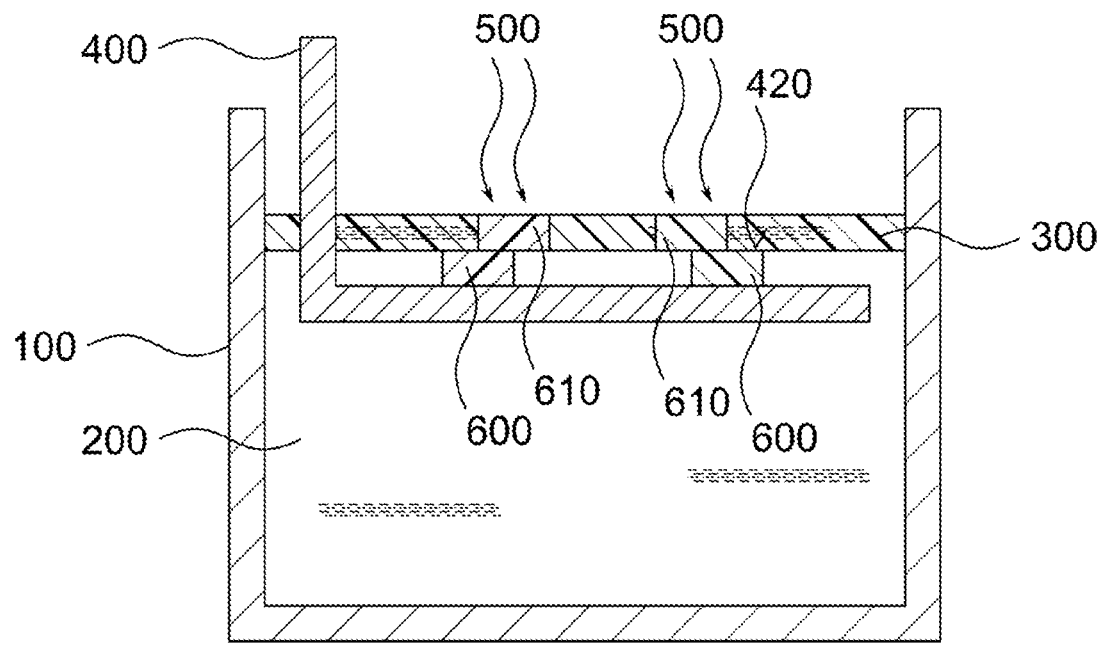
FIG. 2 shows a further step during the process according to the invention

FIG. 2 shows a further step during the process according to the invention

FIG. 1 shows step I) at commencement of the process according to the invention. Disposed in the container 100 is the liquid 200 upon which the free-radically crosslinkable resin 300 comprising a urethane (meth)acrylate floats due to the lower density. The parallel dashed lines in the figures indicate that the liquid 200 and the resin 300 are in the liquid state.

The carrier 400 has been lowered so far into the container 100 that its vertically uppermost surface 410 contacts the layer of the resin 300 from below. According to the first cross section of the article to be constructed the layer of the resin 300 is illuminated with laser light 500 to obtain the first ply of the construction material 600. Said ply is joined to the carrier 400.

FIG. 2 shows the first step II) performed after step I) of the process according to the invention. The carrier 400 was previously displaced downward so that formed above the vertically uppermost surface 420 of the previously deposited ply of the construction material 600 is a layer of the free-radically crosslinkable resin 300 which contacts this first surface 420 of the previously deposited ply of the construction material 600 from below. The loss of resin through the formation of the construction material was compensated by conduits and metering pumps not shown in the figures so that the same amount of resin is present before every step II). The vertical position of the resin 300 remained unchanged. The displacement path and thus the resolution of the article to be produced in the vertical (z) direction may be for example 100 µm, 10 µm or 1 µm. In the next cross section of the article to be constructed the layer of the resin 300 is illuminated with laser light 500 to obtain the next ply of the construction material 610. Said ply is joined to the preceding ply 600. This operation is repeated until the article is formed.

The invention claimed is:

1. A process for producing an article comprising:
    I) depositing a free-radically crosslinked resin on a carrier to obtain a ply of a construction material joined to the carrier which corresponds to a first selected cross section of the article;
    II) depositing a free-radically crosslinked resin on a previously deposited ply of the construction material to obtain a further ply of the construction material which corresponds to a further selected cross section of the article and is joined to the previously applied ply;
    III) repeating step II) until the article is formed;
    wherein depositing a free-radically crosslinked resin at least in step II) further comprises illuminating and/or irradiating a selected region of a free-radically crosslinkable resin corresponding to the respective selected cross section of the article, wherein the free-radically crosslinkable resin comprises a urethane (meth)acrylate,
    wherein the carrier is arranged inside a container containing the free-radically crosslinkable resin and a liquid immiscible with the free-radically crosslinkable resin and which has a higher density than the free-radically crosslinkable resin causing the free-radically crosslinkable resin to float on the liquid, and
    wherein, before each step II), the method further comprises altering a distance between the carrier and the free-radically crosslinkable resin to form a layer of the free-radically crosslinkable resin above a vertically uppermost surface of the previously deposited ply of the construction material and that at least partially contacts the uppermost surface of the previously deposited ply of the construction material, and
    at least once during the process, re-adding a proportion of the free-radically crosslinkable resin withdrawn by deposition of the free-radically crosslinked resin.

2. The process as claimed in claim 1, wherein the free-radically crosslinkable resin comprises:
    at least one isocyanate-functional compound comprising at least one radiation-curable group comprising at least one of a vinyl, a propenyl, an allyl, a vinyl ether, a maleyl, a fumaryl, a maleimide, a dicyclopentadienyl, an acrylamide, and a (meth)acrylate group; and
    at least one NCO-reactive compound.

3. The process as claimed in claim 1, wherein the article is further heated to a temperature of ≥25° C.

4. The process as claimed in claim 1, wherein the liquid immiscible with the free-radically crosslinkable resin comprises at least one of a silicone oil, a halogenated hydrocarbon, a polyethylene wax, water, saltwater, glycerol, a metal melt, an ionic liquid, and a mixture thereof.

5. The process as claimed in claim 1, wherein at least in step II) the depositing of the free-radically crosslinked resin further comprises illuminating and/or irradiating the selected region of the free-radically crosslinkable resin with UV light.

6. The process as claimed in claim 1, further comprising, before every step II), vertically lowering the carrier while maintaining the vertical position of the free-radically crosslinkable resin constant.

7. The process as claimed in claim 1, further comprising heating the liquid immiscible with the free-radically crosslinkable resin to a temperature of ≥25° C.

8. The process as claimed in claim 1, further comprising providing a vertical temperature gradient in the liquid immiscible with the free-radically crosslinkable resin, wherein the temperature decreases vertically downward.

9. The process as claimed in claim 1, further comprising, before every step II), re-adding a proportion withdrawn from the free-radically crosslinkable resin by deposition of the radically crosslinked resin.

10. The process as claimed in claim 1, further comprising providing an amount of free-radically crosslinkable resin at a commencement of the process in such a way that it corresponds to a volume of the article to be produced plus an addition of ≤10%, wherein no new free-radically crosslinkable resin is added during the process.

11. The process as claimed in claim 1, further comprising varying a layer thickness of the free-radically crosslinked resin from layer to layer through the vertical displacement of the carrier.

12. The process as claimed in claim 1, further comprising projecting UV radiation for curing from at least one projector onto a surface of the resin as an image.

13. The process as claimed in claim 1, further comprising inscribing UV radiation for curing from at least one laser onto a surface of the resin.

14. The process as claimed in claim 1, wherein the free-radically crosslinkable resin is a solid at 23° C. and the process further comprises heating the free-radically crosslinkable resin to an extent that it has a viscosity of $\leq 100000$ mPa·s based on DIN EN ISO 2884-1.

* * * * *